United States Patent [19]

McCuaig

[11] 4,039,378
[45] Aug. 2, 1977

[54] PU-ZR ALLOY HIGH-TEMPERATURE ACTIVATION-MEASUREMENT FOIL

[75] Inventor: Franklin D. McCuaig, Westmont, Ill.

[73] Assignee: The United States of America as represented by the United States Energy Research and Development Administration, Washington, D.C.

[21] Appl. No.: 735,566

[22] Filed: Oct. 26, 1976

Related U.S. Application Data

[62] Division of Ser. No. 451,615, March 15, 1974.

[51] Int. Cl.² .......................... G21C 3/02; G01T 3/00
[52] U.S. Cl. .................................... 176/70; 75/122.7; 176/19 R; 176/89; 250/390
[58] Field of Search .................. 75/122.7; 176/68, 89, 176/19 R, 75, 70; 250/390

[56] References Cited

U.S. PATENT DOCUMENTS

| | | | |
|---|---|---|---|
| 2,950,967 | 8/1960 | Schonfeld et al. | 75/122.7 |
| 3,004,906 | 10/1961 | Binstock | 176/75 X |
| 3,072,475 | 1/1963 | Baker et al. | 75/122.7 X |
| 3,600,585 | 8/1971 | Kelly et al. | 75/122.7 X |

OTHER PUBLICATIONS

Marples, J. A. C. "The Lattice Parameters of Some δ- and ε- Plutoniun Alloys," In *J. Phys. Chem. Solids.* 25: pp. 521–534, 1964.

Harvey, M. R. et al. "Chemical Diffusivities of Delta Stabilized Pu-Zr Alloys," *Trans ASM,* 62: 1014–1015, 1969.

Marples, J. A. C. "The Plutonium-Zirconium Phase Diagram," In *J. Less Com. Met.* 1960.

*Primary Examiner*—Richard E. Schafer
*Attorney, Agent, or Firm*—Dean E. Carlson; Frank H. Jackson; Robert J. Fisher

[57] ABSTRACT

A nuclear reactor fuel alloy consists essentially of from slightly greater than 7 to about 4 w/o zirconium, balance plutonium, and is characterized in that the alloy is castable and is rollable to thin foils. A preferred embodiment of about 7 w/o zirconium, balance plutonium, has a melting point substantially above the melting point of plutonium, is rollable to foils as thin as 0.0005 inch thick, and is compatible with cladding material when repeatedly cycled to temperatures above 650° C. Neutron flux densities across a reactor core can be determined with a high-temperature activation-measurement foil which consists of a fuel alloy foil core sandwiched and sealed between two cladding material jackets, the fuel alloy foil core being a 7 w/o zirconium, plutonium foil which is from 0.005 to 0.0005 inch thick.

4 Claims, 1 Drawing Figure

U.S. Patent     Aug. 2, 1977     4,039,378
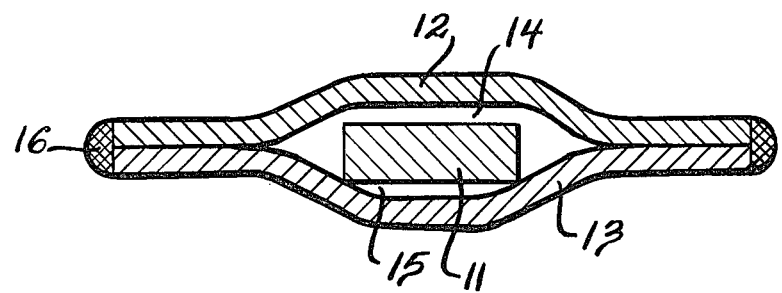

PU-ZR ALLOY HIGH-TEMPERATURE ACTIVATION-MEASUREMENT FOIL

CONTRACTURAL ORIGIN OF THE INVENTION

The invention described herein was made in the course of, or under, a contract with the UNITED STATES ATOMIC ENERGY COMMISSION.

DIVISIONAL APPLICATION

This application is a division of copending application, Ser. No. 451,615, filed Mar. 15, 1974.

BACKGROUND OF THE INVENTION

Further development and studies of nuclear reactors call for studies of reaction rates in heterogeneous fast reactors. Studies include the measurement of neutron flux densities in various positions across a reactor core such as by inserting a nuclear reactor fuel material at various positions in the core and measuring the activation induced in these fuel materials. Some of these studies involve or require the use of actinide foils at elevated temperatures, the actinide fuel material in some cases being surrounded by a cladding material to prevent surface oxidation of the actinide fuel material during the tests.

Applied physics studies of reaction rates and measurements of neutron flux densities in reactor cores, such as are being conducted in the variable - temperature rodded - zone experiments in the Zero Power Reactor experiments at Argonne National Laboratory, a description of which can be found in Argonne National Laboratory Report ANL-7639 and other subsequent reports, require the use of high-temperature activation-measurement foils. It is desirable that these high-temperature activation-measurement foils be produced from nuclear reactor fuel materials. However, a problem is encountered in these experiments when plutonium is the desired fuel material, as plutonium has a melting point of about 640° C. which is below the temperatures reached during these experiments. While it is known that the melting point of plutonium fuel material can be increased by alloying the plutonium with other metals or with a combination of other metals in various proportions, other requirements for the production of the fuel alloy foil materials for use in these experiments are as equally important as an increase in the melting point. A first requirement is that the plutonium content be at least 90 w/o (weight percent) in order to insure consistent and accurate measurements. Since the material is to be used as a thin fuel foil, it is very essential that the plutonium alloy be castable and rollable to very thin foils. It is also necessary that the fuel foil be compatible with the cladding material jacket which surrounds the foil and that the foil remain compatible with the cladding material when repeatedly cycled to temperatures in excess of 650° C. If any alloying would occur between the foil and the cladding material during the repeated cycling to the elevated temperatures, the accuracy of the activation measurements would be destroyed, and any tendency for such alloying or any incompatibility is therefore impermissible.

Therefore, it is an object of the present invention to provide a nuclear reactor fuel alloy of a minimum of 90 w/o plutonium, which alloy is castable and rollable to very thin foils.

It is another object of the present invention to provide a nuclear reactor fuel alloy whose melting point is significantly greater than the melting point of plutonium.

It is another object of the present invention to provide a nuclear reactor fuel alloy foil which is compatible with cladding material at elevated temperatures.

Another object of the present invention is to provide a high-temperature activation-measurement foil containing at least 90 w/o plutonium, which foil is compatible with cladding material when repeatedly cycled to temperatures above 650° C.

SUMMARY OF THE INVENTION

In accordance with the present invention a nuclear reactor fuel alloy is composed of from slightly greater than 7 to about 4 w/o zirconium, balance plutonium. This particular alloy composition increases the melting point of the plutonium significantly above 650° C. and still has the very important properties of being castable and rollable to thin foils. It has been found that for alloy compositions containing significantly more than 7 w/o zirconium, although the melting point of the alloy is increased, the alloy is no longer workable but rather becomes very brittle and cannot be rolled to thin foils and is, therefore, undesirable. At alloy compositions below 4 w/O zirconium, the melting point of the alloy is not raised sufficiently over the melting point of pure plutonium. Preferably the alloy composition is 7 w/o zirconium, balance plutonium, as it has been found that this particular fuel alloy composition can be easily rolled to foils as thin as 0.0005 inch thick, and this particular composition is compatible with cladding material even when repeatedly cycled to temperatures in excess of 650° C.

BRIEF DESCRIPTION OF THE DRAWING

Other objects and advantages of the present invention will become apparent upon reading the following description of the invention and with reference to the drawing which is a cross-sectional view of a high-temperature activation-measurement foil in accordance with the present invention.

DESCRIPTION OF THE INVENTION

In accordance with the present invention, a plutonium alloy fuel material is provided which can be used for high-temperature activation-measurement foils for applied physics studies of reaction rates in heterogeneous fast reactors. The plutonium alloy fuel material of the present invention is composed of from slightly greater than 7 to about 4 w/o zirconium, balance plutonium, and has properties which satisfy the requirements of the physics measurement studies. The alloy provides more than 90 w/o plutonium in a finished foil, is castable and is rollable to thin foils as thin as 0.0005 inch thick, and additionally, is compatible with cladding materials, in particular aluminum and various stainless steel cladding materials, at elevated temperatures even when cycled numerous times to temperatures in excess of 650° C.

Since plutonium itself has a melting point of only 640° C., it was known that it would be necessary to alloy the plutonium in order to raise the melting point. However, while it was known that alloying plutonium with various other metals and combinations of metals could raise the melting point of the alloy above that of plutonium, it was also appreciated that merely developing an alloy whose melting point is greater than the melting point of plutonium would not be sufficient, as an acceptable alloy must also satisfy the other factors and requirements of the physics studies which are equally important.

Therefore, several alloys which appeared promising were produced and tested to determine their characteristics and to determine if their properties satisfied the requirements for the high-temperature activation-measurement foils. Both binary and ternary alloys of plutonium, zirconium, titanium, and aluminum were made and were tested for formability, corrosion resistance, and melting point. The alloys were made in a button arc furnace that has a water-cooled copper hearth and a high-purity argon-gas atmosphere. A zirconium getter button was melted just before melting the alloy charge to reduce the impurities in the furnace atmosphere.

Attempts were made to roll the alloys to foils of 0.005 and 0.0005 inch thickness. Rolling was performed on a two-high Stanat mill using rolls heated to 300° F. The preliminary rolling of the alloy button was done with a 0.025 inch reduction/pass. The button was heated to 675° C. between each pass. Secondary rolling was started after the alloy button was reduced to a thickness of 0.012 inch. The alloy was placed in a Type 304L stainless steel envelope with a 0.030 inch wall and was reduced to 0.0015 inch. Intermediate furnace anneals at a temperature of 160° C. were used. The final reduction to 0.0005 inch was made in the envelope at room temperature.

Examples of the alloys tested are listed in the following table.

DEVELOPMENT ALLOYS FOR HIGH-TEMPERATURE ACTIVATION-MEASUREMENT FOILS

| Alloy Number | Alloy |
| --- | --- |
| 1 | 96 w/o Pu-4 w/o Zr |
| 2 | 92 w/o Pu-8 w/o Zr |
| 3 | 93 w/o Pu-7 w/o Zr |
| 4 | 90 w/o Pu-10 w/o Zr |
| 5 | 95 w/o Pu-3.5 w/o Zr-1.5 w/o Ti |
| 6 | 93 w/o Pu-3.5 w/o Zr-3.5 w/o Ti |
| 7 | 97.25 w/o Pu-2.75 w/o Al |
| 8 | 95 w/o Pu-5 w/o Al |
| 9 | 97.5 w/o Pu-2.5 w/o Al |

Two of the alloys tested, No. 3 and No. 5 in the table, were rolled to foils of 0.005 and 0.0005 inch thickness without difficulty. Other alloys were rejected when excessive cracking developed at various percentages of reduction.

Of the many various alloys tested, it was found that the alloys of plutonium and aluminum were not acceptable, as the characteristics of these alloys did not satisfy the requirements of the high-temperature activation foils.

Although the 3.5 w/o zirconium - 3.5 w/o titanium alloy, No. 6 in the table above, proved not to be satisfactory, it was found that alloy No. 5, the 3.5 w/o zirconium - 1.5 w/o titanium, was acceptable. This alloy was found to be workable and rollable to thin foils. However, it is more difficult and expensive to make an alloy of three elements and there is a greater chance of having stray phases introduced into the alloy during the working period. Therefore, although this particular alloy could be used, it is not preferred.

The best results were obtained with alloy No. 3 which had a composition of 93 w/o plutonium, 7 w/o zirconium. Further studies on plutonium - zirconium alloys showed that the range from 4 w/o zirconium to slightly greater than 7 w/o zirconium was the desired range for an acceptable plutonium alloy fuel material. At weight percentages of zirconium significantly above 7% such as the 10 w/o zirconium alloy No. 4 in the table, the alloys were too brittle and, in fact, broke up when attempts to roll the material to a thin foil were made. Even the alloy No. 2, 92 w/o plutonium - 8 w/o zirconium, proved to be too difficult to work and therefore was unacceptable. While the alloy No. 1 containing 96 w/o plutonium - 4 w/o zirconium proved to be workable and could be rolled to very thin foils, the melting point of this alloy is not as high as the melting point of alloys containing a higher weight percent zirconium. In fact, it has been determined that alloys containing less than 4 w/o zirconium do not increase the melting point of the alloy over the melting point of plutonium sufficiently to be satisfactory for the present purposes. Therefore, it is necessary that the alloy be composed of greater than a minimum of 4 w/o zirconium.

Other studies have shown that fuel alloys containing an amount of zirconium significantly above 7 w/o zirconium will be unsatisfactory, as it will introduce a problem of incompatibility with cladding materials. In particular, plutonium fuel alloys containing more than slightly greater than 7 w/o zirconium will pose problems of compatibility with stainless steel claddings when cycled to temperatures of above 650° C., the temperatures and conditions which will be involved in the use of the high-temperature activation-measurement foils. Therefore, the acceptable range for the plutonium fuel alloy material is from slightly greater than 7 w/o zirconium to about 4 w/o zirconium, with a composition on the lower side of 7% being more desirable than a composition above 7 w/o zirconium, and a composition of about 7 w/o zirconium being preferred.

Referring now to the drawing, there is shown a cross-sectional view of a high-temperature activation-measurement foil in accordance with the present invention. A fuel alloy foil core 11 consisting of the composition described above and of very thin dimensions, typically being from 0.005 to 0.0005 inch thick, is sandwiched and sealed between two cladding material jackets 12 and 13. While the cladding material jackets can be composed of a variety of standard cladding materials, typically the cladding material will be aluminum or a stainless steel, in particular Type 304L stainless steel or Type 302 stainless steel. While the foils and cladding material jackets can be of several various shapes, typically the core and the cladding material jacket will be disc-shaped. The jackets are generally ¼ to ½ inch in diameter with a ⅜ inch diameter jacket, and consequently finished activation foil, being commonly used. The cladding material jackets 12 and 13 can be provided with cavities 14 and 15 respectively, typically of the order of 0.003 inch deep, which serve to center the fuel alloy foil and promote ease of fuel loading during assembly work. The fuel alloy foil core is sealed between jackets 12 and 13 such as by welding the jackets 12 and 13 about the periphery thereof as is indicated by the peripheral weld 16.

In use, the activation-measurement foil would be placed between the oxide rod elements in the fuel elements of a test reactor, the cladding about the fuel alloy foil core serving to prevent fuel foil surface oxidation and contamination during the experiments. Since the distance from the oxide fuel to the plutonium fuel alloy foil core can be important from a physics viewpoint, an investigation was conducted and it was determined that typically used dimensions for the cladding material jacket of 0.003 inch and 0.005 inch were both acceptable. Following assembly and insertion between oxide rod elements, the assembled fuel elements are ready for employment in a test reactor. After a period of irradiation in the reactor, the activation-measurement foil is readily recoverable for counting in making the activation measurements.

The embodiments of the invention in which an exclusive property or privilege is claimed are defined as follows:

1. A high-temperature activation-measurement foil comprising: a fuel alloy foil core sandwiched and sealed between two cladding material jackets, wherein said fuel alloy foil is from about 7 to about 4 weight percent zirconium, balance plutonium, and said fuel alloy foil core is from 0.005 to 0.0005 inch thick.

2. The high-temperature activation-measurement foil in accordance with claim 1 wherein said fuel alloy foil is about 7 weight percent zirconium, balance plutonium, and said fuel alloy foil core is compatible with said cladding material jacket when cycled to temperatures of 650° C.

3. The high-temperature activation-measurement foil in accordance with claim 2 wherein each of said two cladding material jackets are provided with a cavity which accepts the fuel alloy foil core and serves to center said core.

4. The high-temperature activation-measurement foil in accordance with claim 3 wherein said activation-measurement foil is disc-shaped and about ⅜ inch in diameter, said cladding material jackets are about 0.003 inch thick, said cavities are 0.003 inch deep and said jackets are welded together about the periphery thereof.

* * * * *